Nov. 8, 1955 A. P. YERKES 2,722,709
SWEEPING MACHINE WITH AIR BLAST GENERATING MEANS
Filed April 16, 1952
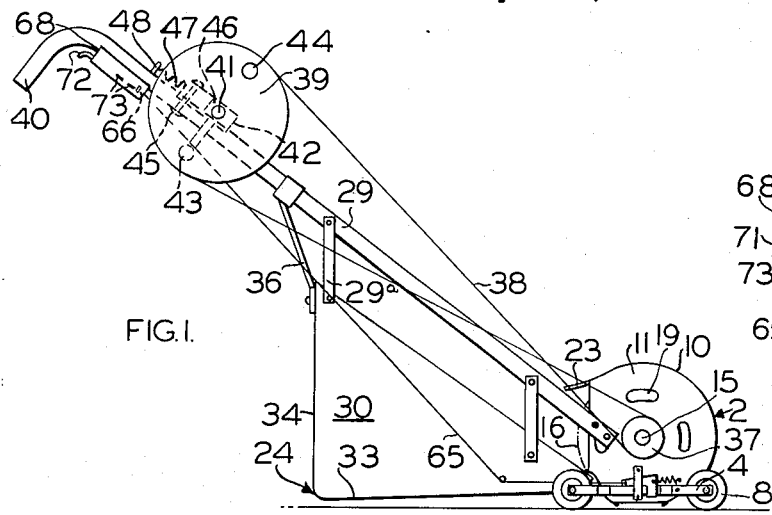
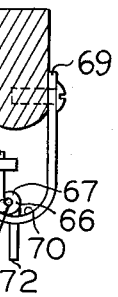
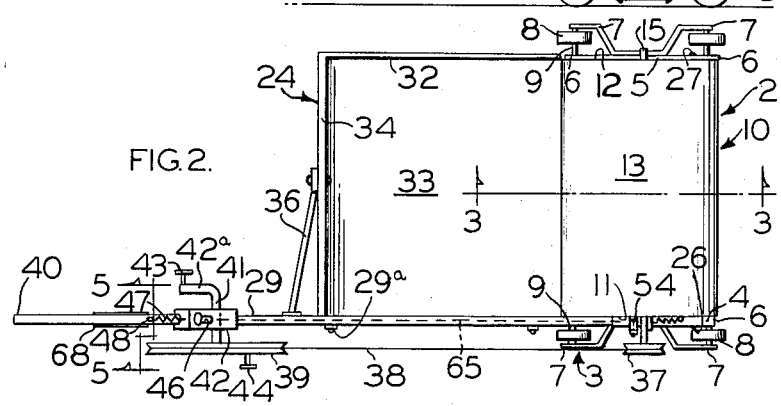
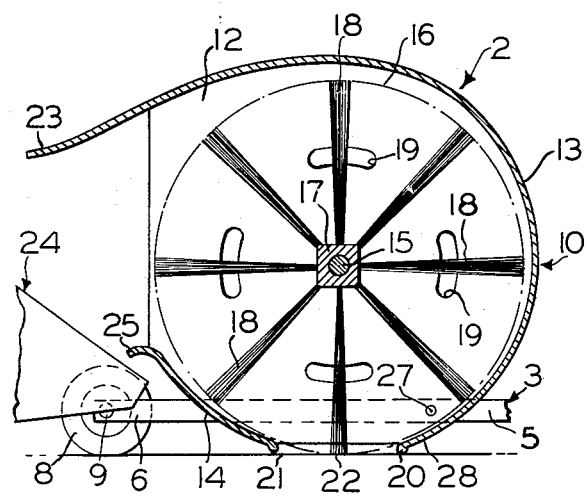
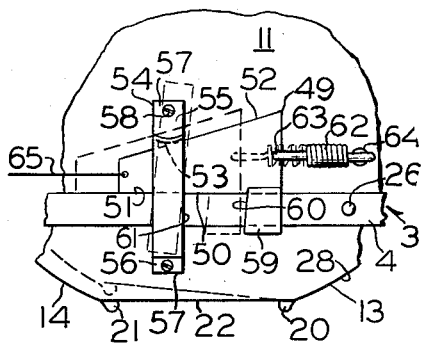
INVENTOR
ARNOLD P. YERKES
BY John J. Kowalik
ATT'Y

United States Patent Office 2,722,709
Patented Nov. 8, 1955

2,722,709

SWEEPING MACHINE WITH AIR BLAST GENERATING MEANS

Arnold P. Yerkes, Winnetka, Ill.

Application April 16, 1952, Serial No. 282,559

8 Claims. (Cl. 15—343)

This invention relates to sweepers of a type adapted for use upon lawns and streets and the like and more particularly to a novel machine which may be operated economically and efficiently and in locations normally operationally not feasible for machines of conventional design.

A general object of the invention is to provide a novel sweeper incorporating a manually operable rotary brush positioned proximate to the ground and adapted to be actuated at the will of an operator in either direction of rotation and independently of the traverse of the machine over the terrain.

More specifically, the invention contemplates the provision of a sweeper wherein the brush is designed to effect, in addition to sweeping contact, a fan action within an enclosing housing with controlled admission of air adjacent to the radial center of the brush, which, together with a selective wide range of rotational speeds of the brush in either direction combine to obtain greater effectiveness in lifting debris from the ground and depositing it into a receptacle.

Another object of the invention is to devise a mechanical sweeper that eliminates the necessity of using a hand rake to remove leaves and litter from under bushes and hedges, around trees and other obstructions, or from depressions and ruts, in order to dispose them where the sweeper may gather them while moving forward, as must be done with sweepers heretofore available, because their brushes rotate only in one direction and only while the machines are moving forward.

A further object is to devise a small, light and efficient lawn sweeper especially adapted for small homesites where machines of current designs are entirely impracticable, because of their large size, excessive weight, and high cost, the ground-wheel drive of the brushes, and their limited usefulness because of small areas of open lawn and their inability to operate close to obstructions of any kind.

A different object is to devise a sweeper with novel means for adjusting the height of the brush consistent with optimum efficiency under various conditions, said means simultaneously effecting commensurate adjustment of the housing to admit varying bunches of debris under the brush.

The invention comprehends the provision of an ambulant wheeled carrier pivotally supporting the housing which journals the brush, and means for swinging the housing toward and away from the ground to adjust the height thereof.

A still further object is to spring bias the housing and brush toward the ground, the housing being movable upwardly away from the ground against the resistance of the spring when conditions demand.

These and other objects of the invention will become more apparent from the specification and accompanying drawings, wherein:

Figure 1 is a side elevational view of my novel sweeper;
Figure 2 is a plan view of the sweeper;

Figure 3 is a fragmentary transverse vertical sectional view taken substantially on the line 3—3 of Figure 2;

Figure 4 is a fragmentary enlarged side elevational view of the housing and illustrating the adjusting means for determining the height of the brush and housing;

Figure 5 is an enlarged sectional view taken substantially on line 5—5 of Figure 2; and Figure 6 is an enlarged side view of the wedge and cooperating parts partly in vertical section.

Describing the invention in detail, the sweeper unit generally designated 2, comprises a wheeled ambulant or mobile carrier frame 3 including a pair of laterally spaced longitudinal side members or supports 4 and 5, provided at their forward and rear ends with laterally spaced legs 6 and 7 receiving a wheel 8 therebetween, the wheel 8 being journaled on a generally horizontal axis by a rivet 9 or the like passing therethrough and through the related legs 6 and 7.

The side elements 4 and 5 carry a sweeper comprising a generally cylindrical sheet metal housing or drum 10 therebetween intermediate their ends, the housing 10 being elongated transversely of the line of draft of the machine and having a pair of upstanding side panels or end walls 11 and 12 and spaced intervening transverse arcuate front and rear panel or web segments 13 and 14 interconnecting the side panels about their margins.

Each segment 13 and 14 preferably takes the form of substantially an involute curve oriented about a shaft element 15 journaled in bearings through the approximate centers of the side panels 11 and 12, the shaft 15 defining the axis of rotation of a brush 16 comprising a core 17 connected to the shaft and carrying a plurality of circumferentially spaced axial rows of closely arranged bristles or tufts of flat metal teeth 18, 18 simulating fan blades and designed to move as much air as possible through openings 19, 19 in the panels 11 and 12 without reducing the effectiveness of the bristles in gathering debris. The bristles or brush elements have a length radially whereby they extend downwardly between adjacent margins 20 and 21 of the segments at the bottom side of the drum which border the front and rear edges, respectively, of a receiving opening 22 of the drum. It will be seen from a consideration of Figure 3 that the curvature of the front wall 13 leads first upwardly forwardly from edge 20 and then upwardly rearwardly while progressively receding away from the periphery of the brush. The rear extremity of the wall 13 is continued as a downwardly rearwardly inclined deflector 23 extending from between the side panels 11 and 12 and overhanging a basket or receptacle generally designated 24. The curvature of the rear wall 14 leads upwardly rearwardly from edge 21 while increasingly receding away from the periphery of the brush. The upper rear extremity of the rear wall 14 is terminated preferably below the axis of the brush and is bent abruptly rearwardly to provide a rearwardly projecting overhang 25 over the basket.

Each wall 13 and 14 defines a funnel-like space with the periphery of the brush directed diagonally downwardly toward the ground. It will also be noted that the deflector extension 23 of the front wall 13 overlays the rear extremity 25 of the bottom wall. This forms a convenient stop for deflecting stones, roots, and seed such as acorns etc. into the receptacle which are ejected with considerable force from the housing.

The drum 10 is pivoted at the lower end of its forward side on a generally horizontal axis adjacent to the forward ends of the side supports 4 and 5 by means of coaxial bolts 26 and 27 passing, respectively, through the side panels 11 and 12 of the drum and respective adjacent elements 4 and 5. It will be apparent, that upon elevating the drum, the portion 28 of the front wall of the drum, located below the axis of the bolts 26 and 27, swings upwardly rearwardly to open a large space beneath the drum to admit a large accumulation of debris beneath the brush for attrition thereby or to clear the grass stubble of lawns and position in effective receiving relationship to the debris being swept thereupon.

The drum and receptacle are interconnected by a common member in the form of a handle 29 extending diagonally upwardly rearwardly from the drum and connected as by rivets at its lower forward end to the outboard side of the end wall 11 of the drum. The receptacle 24 is carried by a dependent strap 29a connected at its upper end to the handle member intermediate its ends and at its lower end to an end wall 30 of the basket.

The basket, which is preferably formed of sheet metal such as aluminum, in addition to the wall 30, comprises an integral end wall 32, and bottom and rear walls 33 and 34 interconnecting the end walls 30 and 32. The bottom wall may preferably slope downwardly rearwardly to gravitate the debris to the rear of the basket and along its forward margin may be turned upwardly forwardly for positive retention of the grass or trash. The rear panel 34 of the basket may be additionally secured as by a diagonal brace 36 to the handle 29.

Actuation of the brush is effected by manual driving means comprising a relatively small pulley 37 keyed to the shaft 15 outboardly of the end wall 11 of the drum, the pulley 37 having a belt 38 trained thereabout. The belt extends alongside the handle member 29 and is trained about a relatively large pulley 39 which is movably supported on the handle 29 adjacent to the hand grip 40 thereof formed on the upper rear end of handle 29.

The support for the pulley 39 comprises a shaft 41 journaled intermediate its ends through a mounting block 42, the shaft 41 being keyed or integrally connected at one end to the center of pulley 39 and at its opposite end connected to a crank arm 42a with a handle 43 at its outer end. The external side of the pulley is provided with a crank handle 44. The mounting block 42 is movably connected to the handle member 29 for movement longitudinally thereof by a rivet 45 passing through the member 29 and through a vertical slot 46 elongated longitudinally of the member 29. The end of the block 42 farthest from pulley 37 is hooked to one end of a tension spring 47 which at its other end is hooked to an eye 48 on the handle member 29. The spring 47 maintains the belt under proper tension. The spring 47 may be eliminated and an adjusting bolt substituted for the rivet 45.

The drum lifting and lowering or height-adjusting means comprises cooperating wedge means acting between the ambulant support and the drum and including a generally triangular wedge element 49 having a substantially horizontal bottom surface 50 in slidable engagement with the top edge surface 51 of the side support element 4 of the ambulant carrier. The wedge has a top edge surface 52 sloping downwardly rearwardly and in wedge engagement with a downwardly facing arcuate engaging wedge surface 53 on a U-shaped guide strap element 54, which, at the bight of the U, is disposed outwardly of the wedge in slidable guided engagement with the outboard side thereof, the top leg 55 of the strap providing the surface 53 and the bottom leg 56 extending under the member 4 and spaced a substantial distance therebelow. Each leg 55 and 56 is provided with an outturned flange 57 secured as by a bolt 58 to the adjacent panel 11 of the housing. The wedge may have a depending combination interlocking element and stop 59 for the wedge which may bear against the outboard side of the member 4 and project thereunder to prevent the wedge from lifting off the element 4. Edge 60 of the element 59 may abut edge 61 of the guide 54 for limiting rearward movement of the wedge.

The wedge is constantly being pulled out of wedging action by means of a tension spring 62 hooked at its rear end to an eye 63 in the forward extremity of the wedge. The forward end of the spring 62 is hooked about a post 64 disposed above the axis of rotation of the drum on wall 11, whereby the spring 62 performs the additional function of constantly biasing the housing groundwardly.

The operating means for the wedge comprises a wire 65 connected to an eye at the rear end of the wedge, the opposite end of the wire being connected as at 66 to a latch element 67 carried by a keeper 68 which comprises a plate 69 connected at its upper margin to the handle member 29 adjacent to the handhold thereof, the bottom edge of the plate 69 being bent upwardly to provide a guide groove 70 within which the element 67 is positioned for rotation and movement longitudinally of member 29. The element 67 has an integral laterally outstanding bolt 71 adapted to be swung by element 67 laterally, through a trigger 72 disposed rearwardly of the keeper, out of line with a series of integral keeper catches 73, 73 on the plate 69 and extending across the groove 70.

It will be appreciated that while I have shown the pulley 39 carried on a spring-loaded mounting block 42, the pulley may be otherwise adjustably secured to the handle.

*Operation of the sweeper*

In operation, the operator advances the unit across the terrain by wheeling it while grasping the handhold 40. Upon passing over any debris the operator cranks either crank handle 43 or 44 in either direction. This rotates the pulley 39 which drives belt 38 which rotates pulley 37 and thus the brush shaft 15 connected thereto. Rotation of the brush develops a fan action which draws air through the openings 19, 19 to the radial center of the brush, the air being thrown outwardly centrifugally and then circumferentially along sections 13 or 14 so that the debris, sliding along the front or rear walls 13 or 14 of the drum, depending upon the direction of rotation of the brush, is blown to the trailing ends of the front or rear drum walls and discharged through the discharge opening at the rear side of the drum into the basket. The involute curvature of the front and rear walls of the drum effectively channels the air circumferentially along these walls from the brush center as impelled by the rows of bristles. Chocking is substantially eliminated by the novel approximately involute contour of these walls 13 and 14.

The novel convolution of the front and rear walls 13 and 14 has been found in an actual construction as essential to prevent recirculation of the material which would occur if the walls were cylindrical in close proximity to the periphery of the brush. In the instant design it has been found that the leaves and light material are thrown clear of the brush and carried in the air stream into the receptacle and this air flow is of sufficient magnitude to throw the material to the rear of the receptacle without excessively rotating the brush.

In view of the fact that the discharge outlet is open to the atmosphere, the instant design obtains a directed air current from the outlet to the inlet not only in the narrowing space between the brush and the wall 13 or 14, depending upon the direction of rotation of the brush, but also draws the air by convection from beneath the housing into the nip formed between exterior sides of the curved walls and the ground toward the material being swept at the instant and propels it in the direction of rotation of the brush. This fanning action, blowing diagonally to the ground loosens the leaves and other light material from the ground and into the brush which carries it into the drum whereat the centrifugal air currents discharge the material from the brush against the wall 13 or 14 and the circumferentially moving air stream carries the material through the outlet into the basket.

It will be apparent that the drum is swingable upwardly independently of the adjusting arrangement and that if the operator should straddle a pile of debris, the drum would swing upwardly against the resistance of spring 62, whereby swinging the front wall portion upwardly to admit the accumulation under the brush. Counterclockwise rotation (as seen in Figure 3) of the brush sweeps the debris onto the forward section of the drum and up over the brush and into the container. As the pile decreases, the drum automatically lowers until all of the debris is swept. The manual rotation proceeds independently of ground travel and in either direction at selective speeds determined by the operator's cranking action.

In grasses or lawns where it is desired to sweep over the top of the grass, the drum is elevated to desired height by rotating the element 67 by the trigger 72 to swing the bolt 71 from the line of catches 73. The trigger is then pulled rearwardly whereby pulling the wedge rearwardly against the expansion of the spring 62, which holds the drum surface 53 against surface 52. It will be understood that surface 53 may be considered functionally an integral part of the drum. When the drum is at desired height, the latch is locked by turning the bolt 71 behind the adjacent catch 73. To lower the drum the procedure is reversed.

It will be noted that a cam or other equivalent arrangement may be substituted in lieu of the wedge means and that many other modifications may be made in the preferred construction illustrated and described. It is likewise not intended that the invention be limited to the precise details of construction that make up the mechanism and its components.

I claim:

1. A sweeper comprising an ambulant carrier, a transverse drum supported thereon, a rotary brush journaled within the drum from the ends thereof, said drum having a receiving opening at its bottom side and an outlet opening at its back side, said brush extending from the drum through the receiving opening for sweeping debris therethrough into said drum and discharging the debris within the drum through the outlet opening pursuant to rotation of the brush in either direction, and said drum including arcuate front and rear walls of substantially involute transverse curvature oriented about the brush, each wall being disposed closest to the periphery of the brush adjacent to said receiving opening and gradually receding away from the periphery of the brush to provide a gradually flaring space between the brush and each wall toward said outlet opening, and the ends of the drum having openings therethrough adjacent to the center of the brush for admitting air into opposite ends of the drum to the brush pursuant to rotation thereof, said outlet opening being open to the atmosphere to admit air into the drum in the space along which the brush is traveling in a direction from said outlet opening to said receiving opening.

2. A sweeper comprising an ambulant frame, a transverse housing carried thereby, a brush extending axially longitudinally of the housing and rotatably supported therein, said housing having front and rear walls spaced circumferentially of the housing and defining between one pair of their edges a receiving opening at the bottom of the housing and between the other pair of their edges an outlet opening at the back of the housing, said brush extending peripherally through said receiving opening for sweeping debris through said receiving opening from the ground into the housing and discharging it from the housing through the outlet opening, and manual means operatively associated with the brush for rotating it at various speeds in either direction at the will of an operator actuating the same said front and rear walls being transversely curved about said brush and receding from the periphery of said brush from said one pair to said other pair of edges thereof and defining with said periphery of the brush material receiving spaces widening from said receiving to said outlet opening, said outlet opening being open to the atmosphere for receiving air into the drum and said brush formed and arranged to draw air into the drum attendant to its rotation and moving the air in the narrowing space in a direction from said outlet to said inlet along one of said walls to blow the air toward the ground for entraining light material therein and moving the air in said widening space along the other of said walls from said receiving to said outlet opening, the exterior curvature of each wall converging with the ground for directing air currents toward said receiving opening.

3. A device for sweeping light material such as leaves and the like from the ground comprising a mobile structure, a transverse housing mounted thereon, a brush extending longitudinally of the housing and rotatably supported thereon, said housing having front and rear walls spaced circumferentially of the brush and defining between one pair of their edges an inlet at the bottom of said housing and an outlet between the other pair of their edges at the back of said housing, said brush extending peripherally through said inlet for sweeping said material from the ground into the housing and discharging it from the housing through said outlet, actuating means operatively associated with said brush for rotating it, at least one of said walls having a transverse arcuate contour and disposed in close proximity to the periphery of the brush adjacent to one edge thereof at said inlet and progressively receding radially away from the periphery of said brush toward another edge thereof at said outlet and defining a radially progressively increasing space from said inlet to said outlet about said periphery of said brush to accommodate said light material being thrown free of the periphery of the brush as said material is being moved along said one wall from said receiving to said discharge opening, said housing having end walls with apertures therein communicating with the brush for admitting air thereto and said brush having elements formed and arranged to develop a fan action for blowing the air radially and circumferentially of the housing and entraining said material within said space in a circumferentially moving air stream from said inlet to said outlet out of contact with said brush, said outlet being open to the atmosphere and the other of said walls being formed and arranged to provide a funnel-like space from said outlet to said inlet directed at said inlet diagonally toward the ground to loosen material therefrom and blow the same into the brush simultaneously with said movement of said air radially outwardly of the brush and circumferentially of the housing from said inlet to said outlet in said first-mentioned space whereby material blown into the brush at said inlet is blown out of the brush in said first-mentioned space and entrained in the air current moving therein toward said outlet for carrying the material through the outlet out of contact with the brush.

4. In a machine of the class described, a mobile carrier frame, a sweeper having a transverse generally horizontal housing mounted upon said frame for up and down movement, said housing having circumferentially spaced inlet and outlet openings, said inlet opening disposed on the bottom of said housing, a brush having a center shaft journalled directly from said housing and having brush tufts projecting peripherally through said inlet opening in preset relation to the edges of said opening for sweeping engagement with a surface to be cleaned, said brush being connected with said housing for up and down movement therewith, a downwardly facing surface on said housing, an upwardly facing surface on said carrier frame, adjusting means operative between said surfaces and comprising a wedge having converging upper and lower sides in engagement respectively with said surface on said housing and said surface on said frame and movable in a wedging direction between said surfaces to lift said housing and in a reverse direction to lower said housing, means resiliently biasing said housing downwardly against said wedge, said housing being movable off said adjusting means in an upward direction against the resistance of said resilient means to accommodate excessive bunching of debris therebeneath.

5. A sweeper machine comprising a receptacle, an elongated drum positioned horizontally across the lower front end of the receptacle, means interconnecting said receptacle and drum in said relative relationship, said drum having an intake opening in a bottom portion thereof through which debris and the like may be taken into the drum, said drum having a discharge opening spaced circumferentially thereof from the intake opening and through which the debris in the drum is dischargeable into the receptacle, a rotary element journaled in the drum and extending axially thereof, means for selectively driving the rotary element in either direction, and combined sweeper and air-blast-generating means rotatable within the drum and driven by the rotary element for taking in debris through the intake opening in the drum and discharging the debris through the discharge opening into the receptacle said drum including circumferentially spaced front and rear portions having lower edges defining respectively the forward and rear margins of said inlet opening, an ambulant carrier structure, means pivotally supporting said drum at its forward side on a generally horizontal transverse axis from said carrier structure whereby said drum is pivotal up and down, said front wall portion projecting downwardly to a level for direct contact with mounds of debris in front thereof for pivoting said drum upwardly against the combined weight of said receptacle and drum to press said lower edge of said front wall portion into the debris in effective gathering relationship thereto attendant to rotation of said combined sweeper and air-blast generating means.

6. A sweeper machine according to claim 5, and said drum presenting circumferential surfaces circumscribing said last-mentioned means and progressively receding radially outwardly therefrom in the direction from the inlet opening toward the outlet opening and providing flaring spaces narrowing from said outlet opening to said inlet opening, said outlet opening being open to the atmosphere to permit air to be drawn therethrough by said air-blast-generating means toward said inlet opening along one or the other wall portion in accordance with the direction of rotation of said combined means for fanning debris beneath said inlet opening.

7. In a sweeper, an ambulant support frame, a housing movably carried thereby on a generally horizontal transverse axis, a brush elongated longitudinally of the housing and journaled at its ends from the ends of the housing, adjusting means operative between the housing and the frame for swinging the housing about said axis to position the housing and brush therein at selected levels with respect to the terrain, said adjusting means including an element bearing at spaced areas against opposed surfaces of the frame and the housing and movable in a first direction to swing the housing upwardly about said axis and movably in the second direction to permit the housing to swing downwardly, said housing swingable upwardly off said element when moved over piles of debris, spring means reacting between the housing and said adjusting means and connected at one end to the housing at a point above said axis and extending in a direction away from the axis and connected at its other end to said element and biasing the housing about said axis downwardly and urging said element in said second direction, cooperative abutment surfaces on the housing and said element for limiting movement of said element in said first direction, and means for holding said adjusting means in adjusted position against the reaction of said spring means.

8. The combination according to claim 3 and a receptacle supported on said structure in receiving relation to said outlet and said front wall comprising a deflector extension overhanging said receptacle and projecting rearwardly of said rear wall in overlying relationship thereto the stop stones and the like and deflect the same into the receptacle.

References Cited in the file of this patent

UNITED STATES PATENTS

| | | |
|---|---|---|
| 116,833 | Hall | July 11, 1871 |
| 356,029 | Collins | Jan. 11, 1887 |
| 431,146 | Le Tellier | July 1, 1890 |
| 481,054 | Palmer | Aug. 16, 1892 |
| 481,269 | Thompson | Aug. 23, 1892 |
| 998,517 | Humm | July 18, 1911 |
| 1,119,393 | Binkley | Dec. 1, 1914 |
| 1,811,350 | Curry | June 23, 1931 |
| 2,197,918 | Blake | Apr. 23, 1940 |
| 2,481,652 | Fort | Sept. 13, 1949 |
| 2,601,697 | Troxler | July 1, 1952 |

FOREIGN PATENTS

| | | |
|---|---|---|
| 1,277 | Great Britain | 1858 |
| 4,931 | Great Britain | of 1878 |
| 523,551 | Great Britain | July 17, 1940 |